US007698187B2

(12) United States Patent
Huizing et al.

(10) Patent No.: US 7,698,187 B2
(45) Date of Patent: Apr. 13, 2010

(54) SYSTEM AND METHOD FOR SIMULTANEOUS TRADING OF OPTIONS

(75) Inventors: Albert-Jan Huizing, London (GB); Declan Ward, London (GB)

(73) Assignee: LIFFE Administration and Management, London (GB)

(*) Notice: Subject to any disclaimer, the term of this patent is extended or adjusted under 35 U.S.C. 154(b) by 567 days.

(21) Appl. No.: 11/260,494

(22) Filed: Oct. 28, 2005

(65) Prior Publication Data
US 2007/0100733 A1 May 3, 2007

(51) Int. Cl.
*G06Q 40/00* (2006.01)
(52) U.S. Cl. .......................................... 705/35; 705/37
(58) Field of Classification Search ............. 705/35, 705/36, 37, 38, 39
See application file for complete search history.

(56) References Cited

U.S. PATENT DOCUMENTS

| 5,987,432 | A  | * | 11/1999 | Zusman et al. ............. 705/35 |
| 6,317,727 | B1 | * | 11/2001 | May .................... 705/36 R |
| 6,394,858 | B1 | * | 5/2002  | Geltsch et al. ............. 439/852 |
| 6,829,590 | B1 | * | 12/2004 | Greener et al. ............. 705/38 |
| 6,892,195 | B2 | * | 5/2005  | Lee et al. ................. 706/61 |
| 7,089,206 | B2 | * | 8/2006  | Martin ..................... 705/37 |
| 7,124,110 | B1 | * | 10/2006 | Kemp et al. ................ 705/37 |
| 7,177,833 | B1 | * | 2/2007  | Marynowski et al. ......... 705/38 |
| 7,246,093 | B1 | * | 7/2007  | Katz ....................... 705/37 |
| 7,321,872 | B1 | * | 1/2008  | Kaminsky et al. ............ 705/37 |
| 7,356,498 | B2 | * | 4/2008  | Kaminsky et al. ............ 705/37 |
| 7,415,435 | B1 | * | 8/2008  | Weiss et al. ................ 705/37 |
| 7,433,842 | B2 | * | 10/2008 | Toffey ...................... 705/37 |
| 7,464,055 | B2 | * | 12/2008 | Kelly et al. ................. 705/37 |
| 2002/0082967 | A1 | * | 6/2002  | Kaminsky et al. ........... 705/37 |
| 2002/0128945 | A1 | * | 9/2002  | Moss et al. ................. 705/37 |
| 2002/0188555 | A1 | * | 12/2002 | Lawrence .................. 705/37 |
| 2002/0194115 | A1 | * | 12/2002 | Nordlicht et al. ............ 705/37 |
| 2003/0050879 | A1 | * | 3/2003  | Rosen et al. ................ 705/35 |
| 2003/0083978 | A1 | * | 5/2003  | Brouwer .................... 705/37 |
| 2003/0126056 | A1 | * | 7/2003  | Hausman et al. ............ 705/36 |
| 2004/0030632 | A1 | * | 2/2004  | Hausman ................... 705/37 |
| 2004/0034591 | A1 | * | 2/2004  | Waelbroeck et al. ......... 705/37 |
| 2004/0199452 | A1 | * | 10/2004 | Johnston et al. ............. 705/37 |
| 2005/0027634 | A1 | * | 2/2005  | Gershon .................... 705/37 |

(Continued)

OTHER PUBLICATIONS

The Australian Derivatives Market, Global Investor, Austria pp. 39-52, 1994, ISSN 0951-3604.*

(Continued)

*Primary Examiner*—Alexander Kalinowski
*Assistant Examiner*—Bruce I Ebersman
(74) *Attorney, Agent, or Firm*—Katten Muchin Rosenman LLP

(57) ABSTRACT

A method and system for facilitating trading of equity and index options is provided. The system incentivizes market makers to voluntarily agree to restrict the bid/offer spread on price quotes for options by enabling the market makers to submit batches of bids and offers simultaneously. The system also provides protection to the market makers by enabling withdrawal of certain bids and offers if a cumulative delta on traded options has been exceeded. The system also provides limits on the rates at which individual traders and the overall market submit bids and offers. The system provides summarization of market data to enable market makers to have relevant and timely data at all stages. In this manner, the system achieves increased liquidity of the equity and index options markets.

24 Claims, 7 Drawing Sheets

U.S. PATENT DOCUMENTS

| | | | |
|---|---|---|---|
| 2005/0055305 A1* | 3/2005 | Lutnick et al. | 705/37 |
| 2005/0086090 A1* | 4/2005 | Abrahams et al. | 705/7 |
| 2005/0188028 A1* | 8/2005 | Brown et al. | 709/206 |
| 2005/0246197 A1* | 11/2005 | Shepherd | 705/1 |
| 2006/0047596 A1* | 3/2006 | Bertilsson | 705/37 |
| 2006/0059065 A1* | 3/2006 | Glinberg et al. | 705/35 |
| 2007/0005485 A1* | 1/2007 | Tumen | 705/37 |
| 2007/0043648 A1* | 2/2007 | Chait | 705/37 |
| 2007/0055607 A1* | 3/2007 | Wunsch et al. | 705/37 |
| 2007/0100732 A1* | 5/2007 | Ibbotson et al. | 705/37 |
| 2007/0156574 A1* | 7/2007 | Marynowski et al. | 705/37 |

OTHER PUBLICATIONS

Study on Model and Algorithm of Days-Ahead Multilateral trading in Power Market, Yang Jing, Proceedings of Chinese Society of Electrical Engineers IEE 2006.*

* cited by examiner

SYSTEM AND METHOD FOR SIMULTANEOUS TRADING OF OPTIONS

BACKGROUND OF THE INVENTION

1. Field of the Invention

The present invention relates to the field of financial markets. More particularly, the invention relates to the electronic trading of options products.

2. Related Art

Volatility and uncertainty are ever present in today's financial markets, especially in the equity markets. In the face of this type of uncertainty, treasurers and fund managers are increasingly advised to consider methods of managing their exposure to sharp movements in the financial markets. Equity and index options can provide the flexibility and security required.

Treasurers, fund managers, and other market participants have a number of choices available to them to help them manage their equity exposure. These choices include exchange-traded products, such as futures and options contracts, or over-the-counter (OTC) products, such as swaps, Forward Rate Agreements (FRAs), caps, and floors together with the underlying cash market products themselves. Successful players in today's volatile markets will typically employ the full range of available risk management and trading strategies.

Exchange traded futures and options contracts offer market participants not only a high degree of versatility in their use, but also significant advantages as strategic instruments, especially when complemented by OTC derivative and cash market financial instruments. Indeed, when used effectively, exchange-traded futures and options contracts, in conjunction with cash market and OTC derivative instruments, can enhance returns, reduce risks and manage equity risks with greater certainty, precision and economy.

Retail investors typically prefer to deal directly on an exchange, as opposed to OTC, because they know that exchanges are bound by certain rules and regulations, and because most retail investors do not have access to the OTC markets. With respect to derivatives, the most likely product group to attract retail investors is equity and index options. This is because, provided that the product groups are understood, the cost or "loss" from any transactions can be understood at the outset.

However in order to attract retail investors to the equity and index options markets, clear, transparent and reliable market data must be made available, via a variety of sources. Many electronic equity and index option markets suffer from the problem of "blank screens", where many option series fail to be continually populated with representative "bids" and "offers". The present invention includes features that are intended to address this shortcoming of conventional trading systems.

An option is an instrument that gives its holder the right, but not the obligation, to buy or sell something at fixed price. Options are available on a wide range of products, literally from pork bellies to platinum. For example, Euronext.LIFFE lists options on interest rate futures, government bonds, commodities, and individual equities. In addition, Euronext. LIFFE lists a number of index options products, including the FTSE 100 Index, the CAC 40 Index, the BEL 20 Index, the AEX Index and the FTSE Eurofirst 80 and 100 Indices.

Options offer investors the means to take advantage of individual share price movements and general stock market fluctuations. They may be used in a number of different ways, including the following:

- as a form of insurance against a fall in the price of a share or in an index;
- as a way of generating income from an existing shareholding; and
- for straightforward limited risk speculation.

Options may be risky investments, and the degree of risk largely depends on how they are used. The buying of options involves a limited risk, i.e., the maximum loss is limited to the price paid for the option and therefore is known at the outset. The selling, or "writing", of options, although having a wide range of uses, is a potentially high-risk strategy, requiring a high degree of product knowledge. Investors are typically urged not to write "uncovered" options until they have a thorough understanding of the implications.

There are two types of equity options: calls and puts. The buyer of a call option acquires the right, but not the obligation, to buy shares at a fixed price. The buyer of a put option acquires the right, but not the obligation, to sell shares at a fixed price.

Option information is carried in many national newspapers, and by quote vendors. Detailed information is laid down in the contract specification. In the contract, information can be found about the currency in which the option is traded, the contract size (i.e., the number of shares the option refers to), and the option style (for example, option can be exercised during its lifetime (American style), or only at the end (European style)). Price information is typically set out as shown in FIG. 1.

Each option contract has an expiry date, after which that particular contract is no longer available for trading. When one option expires, another option that has a future expiry date is listed. The expiry dates available for trading are specified in the contract specifications. For most options, the expiry dates available are fixed at three-monthly intervals, and the most common cycles are:

January, April, July, October
February, May, August, November
March, June, September, December For those options at any time of the year, three expiry dates will be quoted for each option. For example, referring again to FIG. 1, in November there will be equity options available on Angus Toys, which is on the January expiry cycle, with expiry dates in January, April and July. When the January options expire, October options will be introduced, so that April, July and October options will then be available.

The price at which an option holder has the right to buy or sell the underlying security is known as the exercise price, or strike price. Exercise prices are typically set by the exchange. American-style equity options may be exercised on any business day up to and including the last trading day. The term "exercise" refers to taking up the right to buy or sell the underlying shares. When an option holder exercises his/her option, a randomly selected writer is notified of this and is required to deliver or take delivery of the underlying shares.

To buy an option, the buyer pays a sum of money, called the premium. Premiums are quoted in the currency specified in the contract specifications. Equity options must be paid for, in full, on the day following that on which the transaction is entered into. This is known as paying "premium up front". Again referring to FIG. 1, an example is provided in which, for simplicity, only one price is shown for each option. In practice, there will always be two prices quoted for each option, a bid and an offer price. For example, the January 240 call option price could be quoted as 23-27. This would mean that, given this option would trade in pence, it would cost an investor 27p to buy this option and that the investor would receive 23p for selling it. The premium for the January 240p call option (i.e., the right to buy the number of Angus Toys shares as specified in the contract specifications on or before the option's expiry day in January, at a cost of 240p per share) is 25p per share. Supposing that the contract size of Angus Toys options is 1000, then the cost of 1 contract would be £250 (i.e., 1,000 shares at 25p/share). This is the amount payable, in full, by the buyer to the seller (i.e., writer) on the day following the transaction.

The value of an equity option contract is influenced by several factors, including the underlying share price, the time to expiry, volatility, dividends, and interest rates. The underlying share price, together with the option's exercise price, determines the intrinsic value of an option. For example, if the share price exceeds the exercise price of a call option by 20p, the option is said to have 20p worth of intrinsic value and to be 20p "in-the-money". In the case of a put option, the reverse is true. A put option is in-the-money when the exercise price exceeds the share price.

Time has a value, since the longer the option has to go until expiry, the more opportunity there is for the share price, and hence the option price, to move. Generally, the further away the expiry day, the higher an option's time value. This is true for both calls and puts. Referring again to Table 1 above, the premium for the January 240 call option on Angus Toys increases from 25p for the January expiry to 35p for the April expiry and to 42p for the July expiry. Therefore, if the payment of the premium gives an investor the right to purchase stock at 240p when the current price is 254p, the option must be worth at least 14p (i.e., the difference between the current share price and the exercise price). This 14p is known as the option's intrinsic value. The remaining 11 p of the total 25p premium is known as the time value. Assuming the same exercise price, this will be greater for options which have a longer time to run until expiry.

Premium=Intrinsic Value+Time Value

The premium for the January 260 call option is 14p. This is because the exercise price, at 260p, is higher than the current underlying price of 254p, so the call option has no intrinsic value. The premium in this case consists solely of time value.

Time value is also affected by how volatile the price of an underlying share has been in the past or is expected to be in the future. More volatile shares attract higher time value as profit opportunities for option holders, and hence risks for option writers, are greater than for shares with more stable prices.

Dividends are paid to shareholders, but not to holders of options. Since the share price tends to fall by the amount of the dividend after it has been announced, it follows that the price of an option will reflect the value of any expected dividend payments.

Interest rates also affect the price of equity options. However, changes in interest rates have a relatively small effect on option premiums.

Equity and index options may be traded by competitive face-to-face open outcry on a trading floor of a market. However, in recent years, some markets have been automated to enable electronic trading of equity and index options, and other financial products. Such markets may operate in a highly versatile, technological environment that offers members and end-users considerable flexibility in the way they choose to access the market. Private investors and institutional users still access the market by dealing through a broker.

In view of the current options market environment, the present inventors have recognized the importance of providing timely and reliable market data to participants in order to provide an incentive for greater trading activity. As described above, the present lack of timeliness of such market data is exemplified by the "blank screens" problem. Accordingly, the present invention is intended to address this problem.

SUMMARY OF THE INVENTION

In one aspect, the invention provides a system for facilitating trading of equity and index options. Each option is assigned to a class. Each class includes a plurality of predetermined series of options. The system includes a server at which each option is actively traded, and an interface in communication with the server. The interface is configured to enable at least one of a bid and an offer for an option to be entered. The server is configured to receive bids and offers for each option via the interface. The interface is further configured to enable a first user to simultaneously enter a plurality of bids and offers within a single message, wherein the number of entered bids and offers is not greater than a first maximum, and wherein a quote for each bid or offer is required to fall within a first predetermined range of values for all series within the class. The interface is further configured to enable a second user to simultaneously enter a plurality of bids and offers within a single message, wherein the number of entered bids and offers is not greater than a second maximum, and wherein a quote for each bid or offer is required to fall within a second predetermined range of values for a predetermined set of series within the class. The predetermined set does not include all series within the class. The interface is further configured to enable a third user to enter an individual bid or offer within a single message with no restriction on a quote for the entered bid or offer.

The server may be further configured to automatically track a cumulative delta for the first user, such that when a bid or offer entered by the first user results in a trade, a delta corresponding to the trade is added to the cumulative delta. When the cumulative delta exceeds a predetermined delta limit, the server may be configured to enable the first user to withdraw all outstanding bids and offers that were simultaneously entered by the first user. The server may be further configured to automatically track a cumulative delta for the second user, such that when a bid or offer entered by the second user results in a trade, a delta corresponding to the trade is added to the cumulative delta. When the cumulative delta exceeds a predetermined delta limit, the server may be configured to enable the second user to withdraw all outstanding bids and offers that were simultaneously entered by the second user.

The server may be further configured to automatically restrict a rate of entry of bids and offers by any user. When a rate of received bids and offers from a user exceeds a predetermined limit, the server may be configured to reject an attempt by the respective user to enter an additional bid or offer. The predetermined limit for an individual user may be set at 100 messages per second. The server may be further configured to automatically restrict an aggregate rate of entry of bids and offers by all users. When an aggregate rate of received bids and offers from all users exceeds a predetermined limit, the server may be configured to reject an attempt to enter a bid or offer by any user. The predetermined aggregate limit for all users may be set at 10,000 messages per second.

In another aspect, the invention provides a method of trading of equity and index options. Each option is assigned to a class. Each class includes a plurality of predetermined series of options. The method includes the steps of enabling a first user to simultaneously enter a plurality of bids and offers for options assigned to the class within a single message, enabling a second user to simultaneously enter a plurality of bids and offers for options assigned to the class within a single message, enabling a third user to enter an individual bid or offer for an option assigned to the class within a single message, and automatically completing a trade by matching a bid to a corresponding offer. For the first user, the number of entered bids and offers is not greater than a first maximum, and a quote for each bid or offer is required to fall within a first predetermined range of values for all series within the class. For the second user, the number of entered bids and offers is not greater than a second maximum, and a quote for each bid or offer is required to fall within a second predetermined range of values for a predetermined set of series within the class. The predetermined set does not include all series within the class. For the third user, there is no restriction on a quote for the entered bid or offer.

The method may further include the steps of automatically tracking a cumulative delta for the first user by adding a delta corresponding to a completed trade whenever a bid or offer entered by the first user is matched, and when the cumulative delta exceeds a predetermined delta limit, enabling the first user to withdraw all outstanding bids and offers that were simultaneously entered by the first user. The method may also include the steps of automatically tracking a cumulative delta for the second user by adding a delta corresponding to a completed trade whenever a bid or offer entered by the second user is matched, and when the cumulative delta exceeds a predetermined delta limit, enabling the second user to withdraw all outstanding bids and offers that were simultaneously entered by the second user.

The method may further include the step of automatically restricting a rate of entry of bids and offers by any user by rejecting an attempt by the respective user to enter an additional bid or offer when a rate of received bids and offers from the user exceeds a predetermined limit. The predetermined limit for an individual user may be set at 100 messages per second. The method may also include the step of automatically restricting an aggregate rate of entry of bids and offers by all users by rejecting an attempt by any user to enter an additional bid or offer when an aggregate rate of received bids and offers from all users exceeds a predetermined limit. The predetermined aggregate limit for all users may be set at 10,000 messages per second.

In yet another aspect, the invention provides a storage medium for storing software for facilitating trading of equity and index options. Each option is assigned to a class. Each class includes a plurality of predetermined series of options. The software is computer-readable. The software includes instructions for causing a computer to enable a first user to simultaneously enter a plurality of bids and offers for options assigned to the class within a single message; enable a second user to simultaneously enter a plurality of bids and offers for options assigned to the class within a single message; enable a third user to enter an individual bid or offer for an option assigned to the class within a single message; and complete a trade by matching a bid to a corresponding offer. For the first user, the number of entered bids and offers is not greater than a first maximum, and a quote for each bid or offer is required to fall within a first predetermined range of values for all series within the class. For the second user, the number of entered bids and offers is not greater than a second maximum, and a quote for each bid or offer is required to fall within a second predetermined range of values for a predetermined set of series within the class. The predetermined set does not include all series within the class. For the third user, there is no restriction on a quote for the entered bid or offer.

The software may further include instructions for causing a computer to track a cumulative delta for the first user by adding a delta corresponding to a completed trade whenever a bid or offer entered by the first user is matched. When the cumulative delta exceeds a predetermined delta limit, the software may further include instructions for causing a computer to enable the first user to withdraw all outstanding bids and offers that were simultaneously entered by the first user. The software may further include instructions for causing a computer to track a cumulative delta for the second user by adding a delta corresponding to a completed trade whenever a bid or offer entered by the second user is matched. When the cumulative delta exceeds a predetermined delta limit, The software may further include instructions for causing a computer to enable the second user to withdraw all outstanding bids and offers that were simultaneously entered by the second user.

The software may further include instructions for causing a computer to restrict a rate of entry of bids and offers by the first user by rejecting an attempt by the first user to enter an additional bid or offer when a rate of received bids and offers from the first user exceeds a predetermined limit. The predetermined limit for the first user may be set at 100 messages per second. The software may further include instructions for causing a computer to restrict a rate of entry of bids and offers by the second user by rejecting an attempt by the second user to enter an additional bid or offer when a rate of received bids and offers from the second user exceeds a predetermined limit. The predetermined limit for the second user may be set at 100 messages per second. The software may further include instructions for causing a computer to restrict an aggregate rate of entry of bids and offers by all users by rejecting an attempt by any user to enter an additional bid or offer when an aggregate rate of received bids and offers from all users exceeds a predetermined limit. The predetermined limit for the aggregate rate may be set at 10,000 messages per second.

BRIEF DESCRIPTION OF THE DRAWINGS

FIGS. 4, 5, 6, and 7 are screen shots of live market data screens for selected equity and index options.

DETAILED DESCRIPTION OF THE INVENTION

The present invention addresses the blank screens shortcoming by providing an incentive to market participants to publish relevant information relating to the fair value of the premium for equity and index options to the electronic market. In so doing, the present invention provides an electronic market model that has the transparency required to enable participants to deal with confidence. According to a preferred embodiment of the invention, this market model is characterized by the presence of two types of participants, hereinafter referred to as "Primary Market Makers" (PMMs) and "Competitive Market Makers" (CMMs). PMMs have obligations to quote tight spreads (i.e., "bids" and "offers") across all of the series within each class of options to which they have been assigned, while CMMs have obligations in only a limited number of series in each class of options to which they have been assigned. For example, in the case of the Amsterdam Exchange, which is part of Euronext.liffe, all Amsterdam-traded contracts (i.e., classes) are grouped into Euronext.liffe Class Combinations (ECCs). The selection for PMM and CMM capacity in a specific ECC is executed by setting several obligation levels for which auctions are held annually. During the bidding rounds, applicants are invited to subscribe to the level of obligations they are willing to accept, for a position of PMM or CMM in the relevant ECC. At the end of the subscription procedure, Euronext.liffe evaluates the subscriptions and appoints the required number of PMMs and CMMs, based on obligations and priority rules. Generally, these contracts have a duration of one year, and all ECCs are re-auctioned every year.

Figure 3:
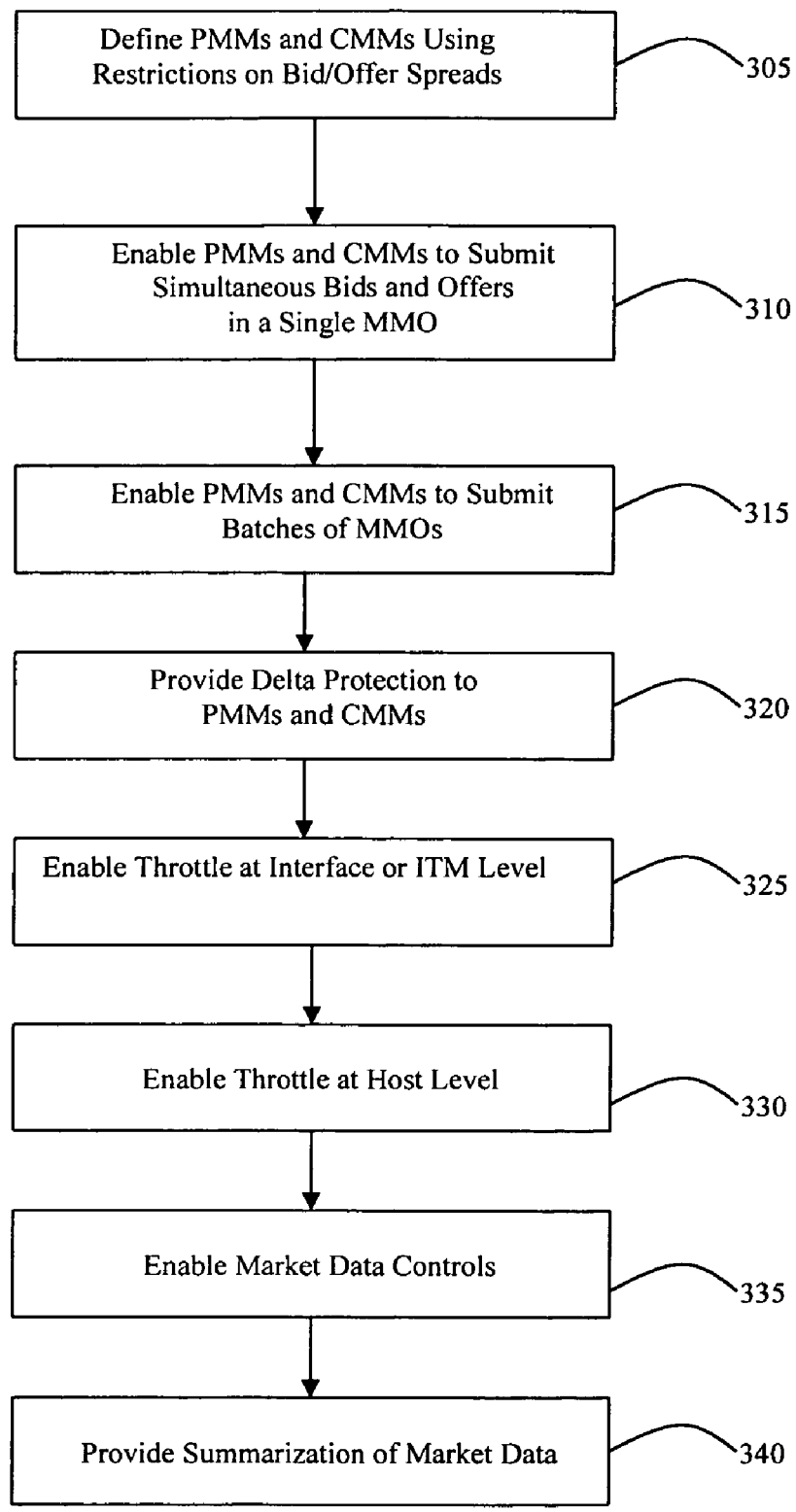
FIG. 3 is a flow chart that illustrates a method of facilitating trading of equity and index options according to a preferred embodiment of the invention.

Referring to FIG. 3, a flow chart 300 illustrates a method of trading equity and index options using a preferred embodiment of the electronic market model according to the present invention. This electronic market model generates order flow from the retail market into equity and index options by ensuring that tight prices are maintained in every option strike. This is achieved, as shown in step 305 of the flow chart 300, by incentivizing specialist market makers (i.e., PMMs and CMMs) to submit tight bid/offer spreads across a wide range of strike prices within a number of ECCs. However, such a market can only rely on PMMs and CMMs to submit tight spreads if the PMMs and CMMs are provided with the underlying technology at the system level. This underlying technology enables the PMMs and CMMs to have timely access to appropriate market information, as further described below.

Figure 1:
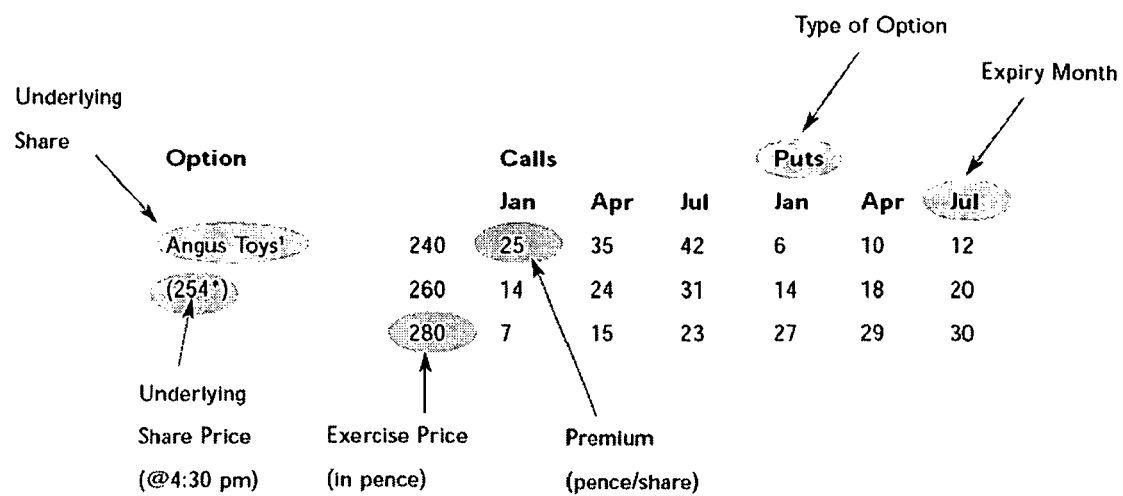
FIG. 1 illustrates an exemplary quote for calls and puts in selected delivery months for an equity option.
Figure 2:
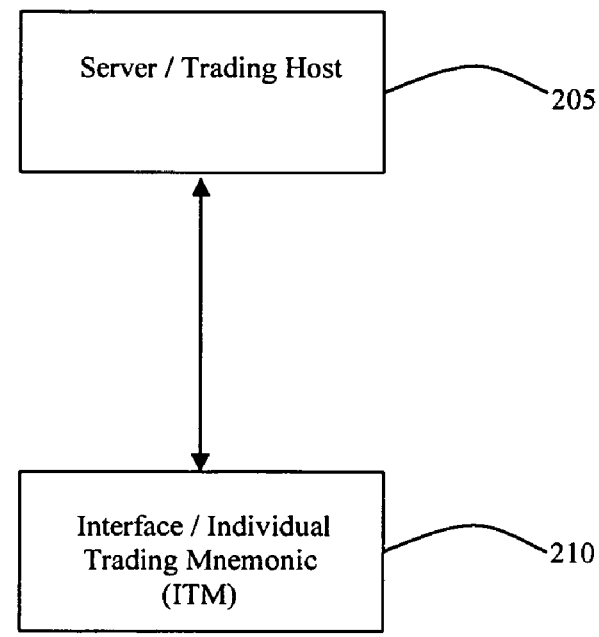
FIG. 2 illustrates a block diagram of a system for facilitating trading of equity and index options according to a preferred embodiment of the invention.

Referring to FIG. 2, a block diagram illustrates an electronic trading system 200 according to a preferred embodiment of the present invention. The system includes one or more servers 205, also referred to as a trading host 205, and one or more interfaces 210, also referred to as an Individual Trading Mnemonic (ITM) 210. The trading host 205 is preferably implemented by the use of one or more general purpose computers, such as, for example, a Sun Microsystems F15k. Each ITM 210 is also preferably implemented by the use of one or more general purpose computers, such as, for example, a typical personal computer manufactured by Dell, Gateway, or Hewlett-Packard. Each of the trading host 205 and the ITM 210 can include a microprocessor. The microprocessor can be any type of processor, such as, for example, any type of general purpose microprocessor or microcontroller, a digital signal processing (DSP) processor, an application-specific integrated circuit (ASIC), a programmable read-only memory (PROM), or the like. The trading host may use its microprocessor to read a computer-readable medium containing software that includes instructions for carrying out one or more of the functions of the trading host 205, as further described below.

Each of the trading host 205 and the ITM 210 can also include computer memory, such as, for example, random-access memory (RAM). However, the computer memory of each of the trading host 205 and the ITM 210 can be any type of computer memory or any other type of electronic storage medium that is located either internally or externally to the trading host 205 or the ITM 210, such as, for example, read-only memory (ROM), compact disc read-only memory (CDROM), electro-optical memory, magneto-optical memory, an erasable programmable read-only memory (EPROM), an electrically-erasable programmable read-only memory (EEPROM), a computer-readable medium, or the like. According to exemplary embodiments, the respective RAM can contain, for example, the operating program for either the trading host 205 or the ITM 210. As will be appreciated based on the following description, the RAM can, for example, be programmed using conventional techniques known to those having ordinary skill in the art of computer programming. The actual source code or object code for carrying out the steps of, for example, a computer program can be stored in the RAM. Each of the trading host 205 and the ITM 210 can also include a database. The database can be any type of computer database for storing, maintaining, and allowing access to electronic information stored therein. The trading host 205 preferably resides on a network, such as a local area network (LAN), a wide area network (WAN), or the Internet. The ITM 210 preferably is connected to the network on which the host server resides, thus enabling electronic communications between the trading host 205 and the ITM 210 over a communications connection, whether locally or remotely, such as, for example, an Ethernet connection, an RS-232 connection, or the like.

Typically, a PMM or CMM will use an ITM 210 to enable entry of orders (i.e., bids or offers) to the server 205. One type of order is known as a Market Making Order (MMO). Referring also to FIG. 3, at step 310, an MMO allows a trader, via his or her ITM 210, to submit simultaneous bids and offers into an options series. The system 200 may provide restrictions on the use of MMOs. For example, within each derivatives product listed on the exchange, the trading host 205 may be programmed to accept entry of MMOs for that product only from ITMs that are registered at the trading host level.

As shown in step 315, MMOs can be submitted in batches, allowing traders to enter multiple bid and offer quotes into a contract. For example, in the Amsterdam market, PMMs can preferably enter up to a maximum of 65 bids and offers into a contract, as a single message. Alternatively, the maximum number of bids or offers entered by a PMM in a single message may be other than 65; for example, 100, 200, 500, or 1000. The trading host 205 then "unravels" the message (i.e., the trading host 205 deconstructs the message into individual bids and offers), and then populates the order book with the updated quotes from the PMM. CMMs, however, who have lesser obligations, are preferably limited to entering up 7 MMOs as a single batch, or message. In an alternative embodiment, the maximum number of MMOs that may be entered by a CMM in a single message may be varied; for example, the CMM maximum limit may be 10, 25, 50, or 100, and it may be varied based on the PMM maximum limit, as described above. This distinction is made to maintain the balance between PMM and CMM obligations, and to ensure there is a clear incentive to take on the extra risk of a being a PMM. Only registered PMMs and CMMs are issued with MMO ITMs 210, thus providing them a distinct advantage over other users of automated trading tools, who typically can only submit single orders into the marketplace.

As indicated in step 320, in a preferred embodiment, the present invention provides another advantageous feature, hereinafter referred to as the "delta protection" facility. Delta protection provides PMMs and CMMs with a degree of protection against being traded on multiple quotes simultaneously. In particular, the delta protection facility maintains a cumulative delta position (i.e., a quantity related to the volume traded via the relevant PMM or CMM ITM 210) on the trading host 205 over the trading day, on a contract or expiry basis, which is updated every time the PMM or CMM trades. When the cumulative delta position exceeds a predetermined delta limit, the trading host 205 sends a message to warn the trader and to provide the trader with the opportunity to withdraw all remaining MMOs (i.e., all untraded bids and offers) in that contract or expiry, or to inactivate all remaining orders by the system immediately once the limit is reached. For example, if for a designated PMM, the delta limit has been set at 40 bids and offers out of the 65 bids and offers that were entered by the designated PMM for a particular contract, then once 40 bids and offers have been accepted, the designated PMM will be warned and provided an opportunity to withdraw the remaining 25 offers and bids in that contract. Because this action is taken at the trading host 205 level, no other market participant can actually trade with that ITM 210 beyond his delta limit, and thus the trader is "delta protected". Delta protection may be provided at both the contract level (i.e., a complete stock or index option) and the expiry level (i.e., the strike prices within an expiry month of a stock or index option).

Enabling the delta protection facility typically provides PMMs and CMMs with a degree of comfort, that any misconfiguration of their system that could lead to the entry of MMOs in the marketplace which are far from fair value (i.e., bids that are too high or offers that are too low) will not, in turn, lead to them being "machine-gunned" out of the marketplace by another PMM or CMM, or by another user of the marketplace who has detected the error. In the event that such a misconfiguration of their quotes leads to another PMM or CMM attempting to hit all their bids, and/or lift all their offers, the delta protection facility automatically withdraws the orders from the trading host 205. In this manner, the financial losses from such a situation can be predicted and controlled.

At steps 325 and 330, in a preferred embodiment, the present invention provides yet a further advantageous feature, hereinafter referred to as an interface "throttle". An interface throttle has a number of key aspects, including the following: 1) Limiting the number of orders submitted within a batch message, as indicated in step 325, and 2) restriction of the rate at which traders can enter messages into the trading host 205, as indicated in step 330. For example, the Euronext.liffe market system trading host 205 includes a default setting which limits the number of orders, or messages per second, which can be input by a normal trader. This default setting is 100 messages per second (mps) for each individual interface or ITM 210; however, the default may be set at any number of messages per second deemed appropriate (e.g., the throttle may be set within the 10-5000 mps range). In addition, the Euronext.liffe market system has a default batch setting of 16 "submit" messages and 64 "revise" messages—a "submit" message involves submitting a new "bid" or "offer" into the marketplace, and a "revise" message involves revising the price and/or volume of an existing order. Again, the batch settings for "submit" and "revise" messages may be varied as appropriate; e.g., each batch setting may vary within the range of 1-1000.

However, the incentive to PMMs and CMMs to maintain tight spreads across a wide range of options strikes may be reduced if they are aware that normal traders will have the ability to submit multiple bids or offers into the marketplace. Thus, it may be desirable to set the throttle at a lower limit, for example, 4 messages per second per contract, or any number of mps per contract in the 1-100 range. In addition, the throttle may be set so as to effectively disable all batch submissions, or set to a maximum batch size of "1". In this manner, PMMs and CMMs may regain confidence that their ability to enter multiple quotes via the MMO facility could not be matched by other traders using automated tools.

As described above, an electronic market model 200 according to a preferred embodiment of the invention is designed to attract order flow from the retail market, because PMMs and CMMs are incentivized to make tight bid/offer spreads, in every strike, in every expiry, for every equity and index option. As an example, the Amsterdam market currently lists approximately 45 equity options, on which are listed approximately 100 strikes (there is some fluctuation up or down in these numbers as new companies are listed or de-listed, or merged, etc.). Therefore, if each underlying equity has a price movement every second, each PMM and CMM assigned to an equity option will need to update his/her quotes, taking into account changes in intrinsic value of the equity option. Assuming that each Amsterdam equity option has at least two PMMs assigned to that option, they will therefore be generating a minimum or 45×100×2=9000 market data updates per second. In addition, certain equity or index options may have larger numbers of strike prices and larger numbers of PMMs or CMMs assigned to them, thus causing the number of market data updates per second to rise significantly. Such amounts of market data, for some customers, may be difficult to efficiently process, particularly during volatile periods.

Referring again to FIG. 3, in a preferred embodiment of the present invention, an electronic market model provides an additional feature designed to alleviate difficulties relating to high data rates, as described above. As indicated at step 335, this feature is referred to herein as a "market data control". At the trading host 205 level, the trading host 205 is programmed to recognize, for a particular market or contract, the absolute market data output (also referred to as the outbound stream). If the outbound stream exceeds a certain rate of messages per second, the market data control is activated so that a predetermined limit of, for example, 10,000 outgoing messages per second is never exceeded. Alternatively, the outbound stream limit may be set as appropriate within the range of 1-5,000,000 outgoing messages per second.

Market data controls may also be implemented at the interface 210 level. For example, in a preferred embodiment, the trading host 205 may be programmed to analyze individual "queues" which may be building at individual interface 210 sessions. Typically, as in the example described above, high levels of market data may be generated under normal conditions (e.g., approximately 9000 messages per second or more). This can cause message queues to build, and hence result in traders "falling behind" the market. If the trading host 205 detects a queue building at an individual interface 210 session level, a market data control may be automatically activated for that individual interface session.

Referring again to FIG. 3, another feature provided by an electronic market model according to a preferred embodiment of the present invention is referred to herein as "summarization", as indicated at step 340. To perform summarization, the trading host 205 contains code that automatically looks for market data (i.e., bid and offer updates) which can be overwritten by more recent updates. For example, whenever a new bid or offer is made by any market participant at a different price than the previous order, that data will be summarized by the trading host 205. In addition, the trading host 205 "coalesces" market data where possible. For example, new orders submitted at a price which already exists in the order book will only result in a volume update. In this way, the amount of market data sent by the trading host 205 at peak times is severely controlled, thus protecting market users. However, trade prices and an individual ITM's responses from the trading host 205 are usually not summarized.

Each of the trading host 205 and the interface 210 has at least one message queue onto which messages are placed. In a preferred embodiment of the invention, the queue is a "black box" that will perform summarization of messages. Messages are inserted on to the queue and the queue will handle the summarization and throttling itself. The implementation of the queue will enable the bulk of the queue implementation to be shared between the interface 210 and the trading host 205. Information about which contracts can be summarized is sent from the trading host 205 to the interface 210. In addition, a throttle will be implemented to enable the trading host 205 to reduce the number of summarized messages sent. For example, a setting of 5000/s would allow a maximum of 5000 summarized messages every second to be available to be sent out. In this manner, the throttle is used to reduce message flow which may allow a queue to build up, thus causing more summarization to occur.

The message queue acts like the normal queues, in that messages can be put on to the tail of the queue and removed from the head of the queue. However, this message queue contains throttling and summarization algorithms, as described above. Typically, each message contains a header that includes a timestamp and commodity key. An example commodity key is "POFTE". The first character indicates the exchange code. The second character is the generic contract type. The remaining three characters are the commodity code. Summarization is typically performed on a commodity key level, which is specified when the queue is initially created, because it will not change during the day. Messages for those commodities not being summarized within the trading host 205 bypass the summarizing queue and throttle mechanism. Although these messages are not be subject to summarization, they still pass through the summarizing queue and throttle mechanism.

The message queue uses a series of rules to determine when messages can be summarized. For example, the rules may be used to determine whether a new OnMarketOrder should overwrite an earlier OnMarketOrder. If the message is for a commodity that cannot be summarized, then that message is processed unchanged. If the message is for a commodity for which summarization is enabled, then additional checks are performed, depending on the type of message. If the message is of a type that cannot be summarized, then that message is inserted on the queue unchanged. If the message is part of a trade, then the state of the market before the trade should not be overwritten. For example, when a trade occurs, the trading host 205 may send out several messages such as "OnMarketOrder" and "OnMarketUpdate". The OnMarketOrder messages for the trade should not be summarized with earlier OnMarketOrder messages, nor should later messages be summarized with these OnMarket Order messages. Accordingly, the messages for that trade are effectively "flushed" from the summarization queue.

A message queue may be flushed at appropriate times, i.e., the message queue may be completely cleared prior to handling future messages. Messages from the same series arriving after the flushing message continue to queue up behind it, and they will not be sent out before the flushing message. A market update message with a trade price has a guaranteed delivery, in that it can not be overwritten or deleted in the throttling process, and the original timestamp of the trade will, therefore, be retained. If a message of a summarizable type for a commodity where the summarization of messages is enabled is sent, then the trading host 205 checks the queue to determine if there are any messages on the queue that the newly sent message can supersede. If so, the earlier message is replaced with the new message, subject to the trade rules described above.

In addition, the message queue will allow "jumping" of messages (again subject to the trade rules described above). Jumping refers to a situation such as the following: the OnMarketOrder for a best bid might arrive either before or after the corresponding OnMarketUpdate, depending on the other messages in the queue at the time. Additionally, a trader who withdraws an order may receive the order book updates for that withdrawal before the withdrawal order status message. An exception to this is the relationship between OnMarketUpdate and OnMarketImpliedUpdate for the same market. The trading host 205 can send out an OnMarketImpliedUpdate message, if the price is at least as good as the price in the OnMarketUpdate message. However, if the order book later changes so that there is a better price in the OnMarketUpdate than in the OnMarketImpliedUpdate, then the OnMarketImpliedUpdate can be completely cancelled. Note that the sending of implieds for a particular market is configured on the trading host 205. Implied updates will be superseded in the throttle queue if any of the following situations occurs: 1) The implied order is followed by a subsequent improved explicit order; 2) an improved implicit order is received, or the volume of the implicit order changes; or 3) a subsequent OnMarketImpliedUpdate message arrives which cancels the original message (i.e., sell or buy price set to zero). There is no series prioritization (i.e., priority based on which series is in the money or out of the money).

In addition, the trading host 205 ensures that all messages retain their given timestamp. If message 1 is overwritten by or summarized with message 2, then the timestamp of message 2 is retained. This will result in timestamps being out of sequence, but the timestamp relates to the time the event happened, not the time that the message was sent out.

Referring to FIGS. 4-7, several exemplary market data screens are shown. These examples may be used to compare and contrast the quality of "on screen" equity and index option markets according to a preferred embodiment of the present invention with the quality of markets for which a more traditional "market making" scheme is employed. All of the examples shown in FIGS. 4-7 are extracted from "live" market data screens from Bloomberg, and are dated and time stamped.

Figure 4:
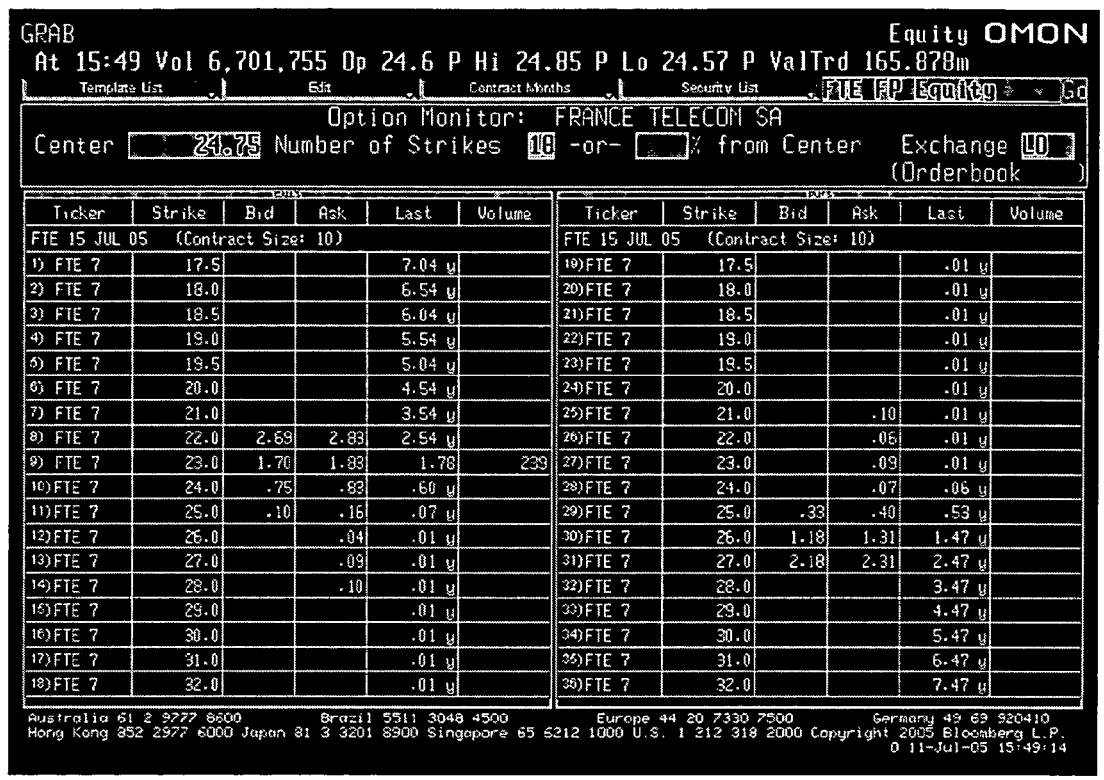

Referring to FIG. 4, a live market data screen for France Telecom is shown. In this example, a highly popular equity option, France Telecom, has a limited number of strike prices which are showing "bids" and "asks". In particular, the market maker is only showing prices for which calculating option values is relatively easy, i.e., approximately equal to the "at the money" value, or very close to the current value of the underlying stock. Bloomberg provides a representation of the current underlying value via the "Centre" price as shown at the top of the screen. It may be seen that prices are only quoted in the "Calls" from the strikes 22 to 28, and in the "Puts" from strikes 25 to 31. Traded volume has only taken place in the 23 calls.

Figure 5:
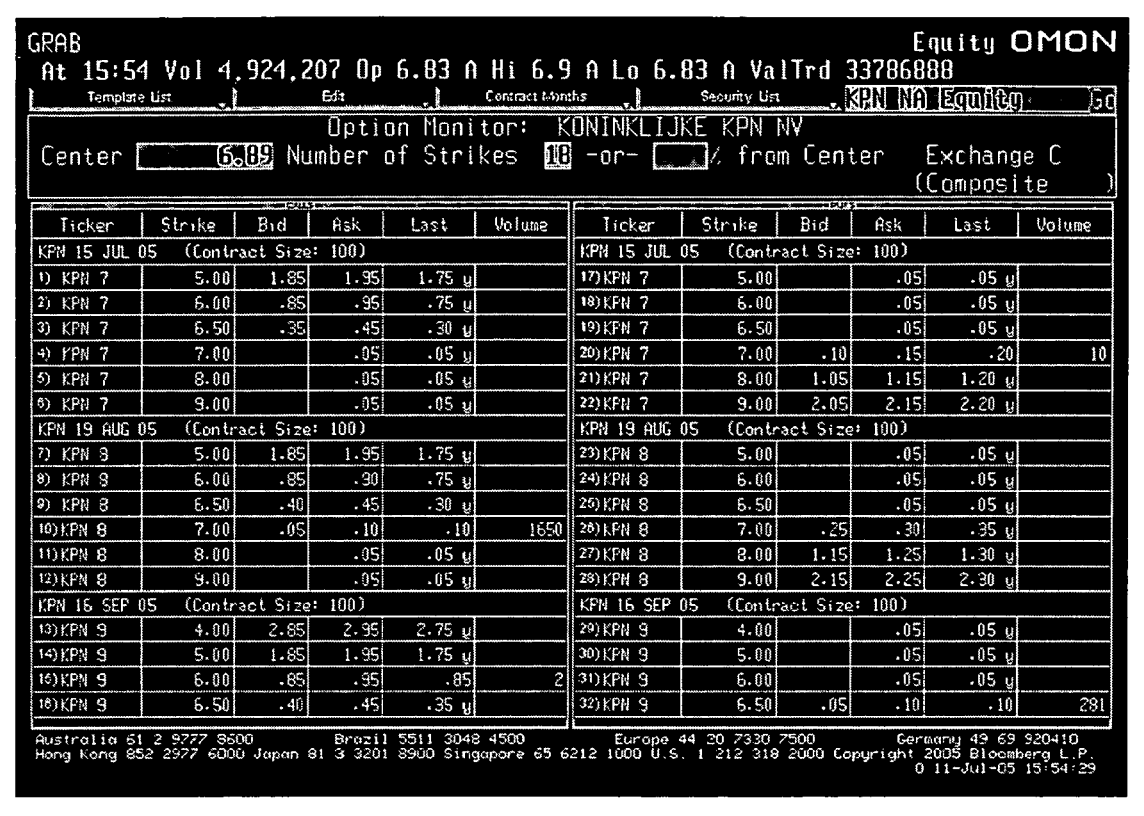

Referring to FIG. 5, a screen shot relating to the KPN equity option is shown. This option is listed on Euronext.liffe Amsterdam, and so is subject to an electronic market model according to a preferred embodiment of the present invention. In this example, market makers are posting bids and asks, across a wide range of strike prices. For example, the Bloomberg "centre" price is 6.89, yet active bids and asks are posted in multiple delivery months, and stretching as high as the 9.00 strikes. Traded volume has taken place in the August 5 7.00 calls, the September 5 6.00 calls, the July 5 7.00 puts, and the September 5 6.50 puts. Referring also to FIG. 4, from a retail investor point of view, far more information is available on screen for making a decision about taking a position in the KPN equity option than for making a comparable decision with respect to France Telecom.

Figure 6:
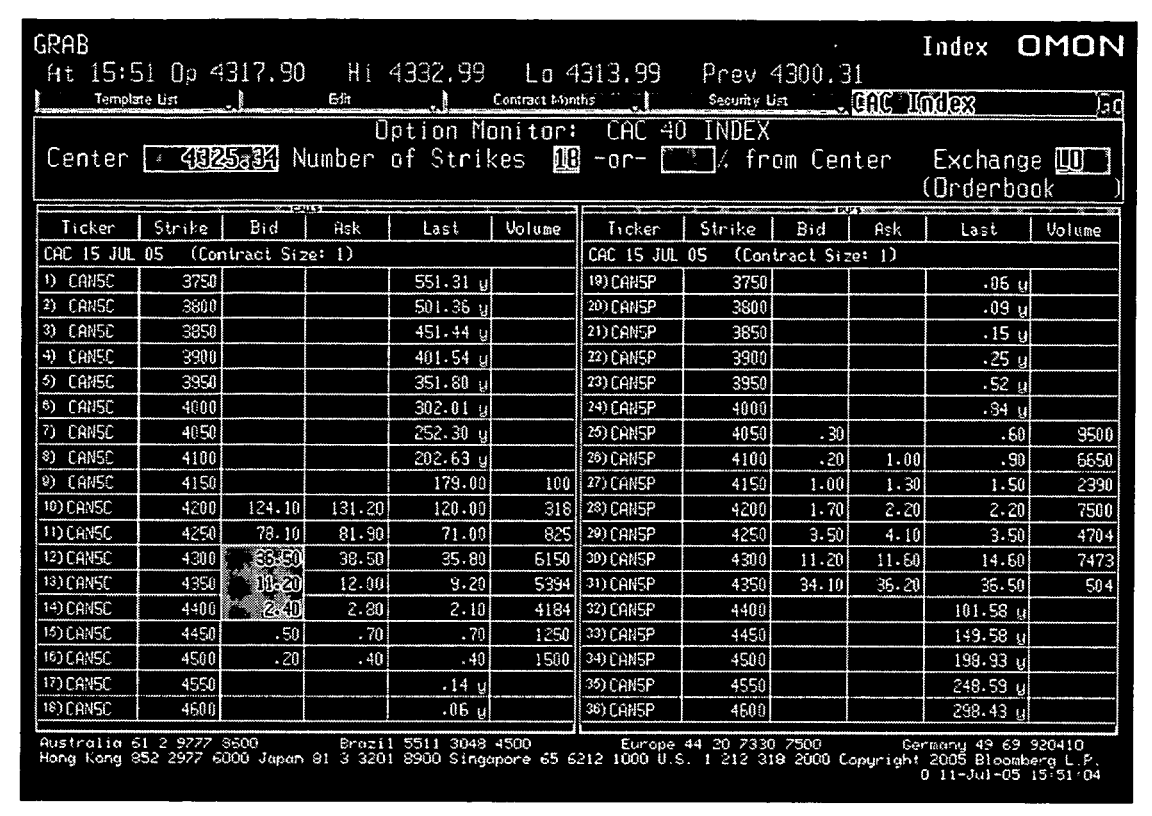

Referring to FIG. 6, another example is shown for the CAC 40 Index Option. The CAC 40 Index Options are currently not subject to an electronic market model according to a preferred embodiment of the present invention. As can be seen, active bids and asks are posted from the 4200 to 4500 calls, and the 4050 to 4350 puts. Traded volume has been active within this tight range.

Figure 7:
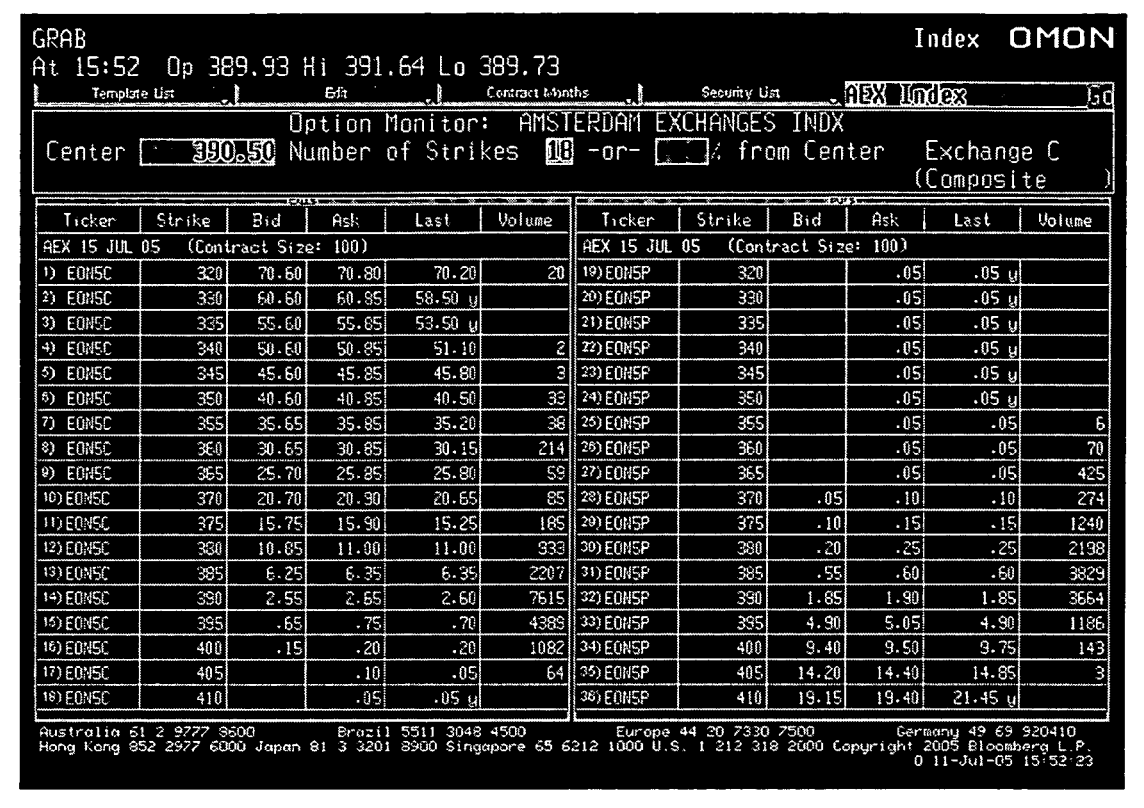

Referring also to FIG. 7, another example is shown for the AEX Index Option, which is listed on Euronext.liffe Amsterdam and therefore uses an electronic market model according to a preferred embodiment of the present invention. The AEX Index Option has active quotes throughout the range of prices that can be shown on the Bloomberg screen. In addition, particularly on the calls, traded volume has been active from the 320 to 410 strikes. It is noted that where bids are shown as blank above against an offer of 0.05, market makers are effectively quoting a bid/offer of 0 to 0.05. Thus, by comparing the relatively sparse amounts of information shown in FIGS. 4 and 6 with the relatively large amounts of information shown in FIGS. 5 and 7 (i.e., the improvement vis-à-vis the blank screens problem), the examples provided in FIGS. 4-7 show how the deployment of Market Making Orders with delta protection, together with multiple competing market makers, may lead to a better quality on-screen market in popular equity and index options.

While the present invention has been described with respect to what is presently considered to be the preferred embodiment, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A system for facilitating trading of equity and index options, each option being assigned to a class, each class including a plurality of predetermined series of options, and the system comprising:
   a server at which each option is actively traded; and
   an interface in communication with the server, the interface being configured to enable at least one of a bid and an offer for an option to be entered,
   wherein the server is configured to receive bids and offers for each option via the interface, and
   wherein the interface is further configured to enable a first user to simultaneously enter a plurality of bids and offers within a single message, wherein the number of entered bids and offers is not greater than a first maximum, and wherein a quote for each bid or offer is required to fall within a first predetermined range of values for all series within the class; and
   wherein the interface is further configured to enable a second user to simultaneously enter a plurality of bids and offers within a single message, wherein the number of entered bids and offers is not greater than a second maximum, and wherein a quote for each bid or offer is required to fall within a second predetermined range of values for a predetermined set of series within the class, the predetermined set not including all series within the class; and
   wherein the interface is further configured to enable a third user to enter an individual bid or offer within a single message with no restriction on a quote for the entered bid or offer; and
   wherein when at least one bid or offer entered by the first user results in a trade, the server is further configured to compute a delta corresponding to a trade, the delta being selected from the group consisting of a volume of the trade and a total number of bids and offers associated with the trade; and, when a subsequent at least one bid or offer entered by the first user results in a subsequent trade, the server is further configured to track a first user cumulative delta by adding a delta corresponding to the subsequent trade to a sum of the previous deltas;
   wherein, when the first user cumulative delta exceeds a predetermined delta limit, the server is configured to enable the first user to withdraw all outstanding bids and offers that were simultaneously entered by the first user.

2. The system of claim 1, wherein when at least one bid or offer entered by the second user results in a trade, the server is further configured to compute a delta corresponding to a trade, the delta being selected from the group consisting of a volume of the trade and a total number of bids and offers associated with the trade; and, when a subsequent at least one bid or offer entered by the second user results in a subsequent trade, the server is further configured to track a second user cumulative delta by adding a delta corresponding to the subsequent trade to a sum of the previous deltas;
   wherein, when the second user cumulative delta exceeds a predetermined delta limit, the server is configured to enable the second user to withdraw all outstanding bids and offers that were simultaneously entered by the second user.

3. The system of claim 1, wherein the server is further configured to restrict a rate of entry of bids and offers by the first user, wherein when a rate of received bids and offers from the first user exceeds a predetermined limit, the server is configured to reject an attempt by the first user to enter an additional bid or offer.

4. The system of claim 3, wherein the predetermined limit is 100 messages per second.

5. The system of claim 1, wherein the server is further configured to restrict a rate of entry of bids and offers by the second user, wherein when a rate of received bids and offers from the second user exceeds a predetermined limit, the server is configured to reject an attempt by the second user to enter an additional bid or offer.

6. The system of claim 5, wherein the predetermined limit is 100 messages per second.

7. The system of claim 1, wherein the server is further configured to restrict an aggregate rate of entry of bids and offers by all users, wherein when an aggregate rate of received bids and offers from all users exceeds a predetermined limit, the server is configured to reject an attempt to enter a bid or offer by any user.

8. The system of claim 7, wherein the predetermined limit is 10,000 messages per second.

9. A method of trading of equity and index options, each option being assigned to a class, each class including a plurality of predetermined series of options, and the method comprising the steps of:
   using a computer to receive from a first user a plurality of bids and offers for options assigned to the class within a single message, wherein the number of received bids and offers is not greater than a first maximum, and wherein a quote for each bid or offer is required to fall within a first predetermined range of values for all series within the class;
   using the computer to receive from a second user a plurality of bids and offers for options assigned to the class within a single message, wherein the number of received bids and offers is not greater than a second maximum, and wherein a quote for each bid or offer is required to fall within a second predetermined range of values for a predetermined set of series within the class, the predetermined set not including all series within the class;

using the computer to receive from a third user an individual bid or offer for an option assigned to the class within a single message with no restriction on a quote for the received bid or offer; and using the computer to complete a trade by matching a bid to a corresponding offer; and using the computer to track a cumulative delta for the first user by adding a delta corresponding to a completed trade whenever a bid or offer received from the first user is matched, the delta being selected from the group consisting of a volume of the trade and a total number of bids and offers associated with the trade; and when the first user cumulative delta exceeds a predetermined delta limit, using the computer to provide an option to the first user to withdraw all outstanding bids and offers that were simultaneously received from the first user.

10. The method of claim 9, further comprising the steps of:

using the computer to track a cumulative delta for the second user by adding a delta corresponding to a completed trade whenever a bid or offer received from the second user is matched, the delta being selected from the group consisting of a volume of the trade and a total number of bids and offers associated with the trade; and when the second user cumulative delta exceeds a predetermined delta limit, using the computer to enable the second user to withdraw all outstanding bids and offers that were simultaneously received from the second user.

11. The method of claim 9, further comprising the step of using the computer to restrict a rate of entry of bids and offers by the first user by rejecting an attempt by the first user to enter an additional bid or offer when a rate of received bids and offers from the first user exceeds a predetermined limit.

12. The method of claim 11, wherein the predetermined limit is 100 messages per second.

13. The method of claim 9, further comprising the step of using the computer to restrict a rate of entry of bids and offers by the second user by rejecting an attempt by the second user to enter an additional bid or offer when a rate of received bids and offers from the second user exceeds a predetermined limit.

14. The method of claim 13, wherein the predetermined limit is 100 messages per second.

15. The method of claim 9, further comprising the step of using the computer to restrict an aggregate rate of entry of bids and offers by all users by rejecting an attempt by any user to enter an additional bid or offer when an aggregate rate of received bids and offers from all users exceeds a predetermined limit.

16. The method of claim 15, wherein the predetermined limit is 10,000 messages per second.

17. A storage medium for storing software for facilitating trading of equity and index options, each option being assigned to a class, each class including a plurality of predetermined series of options, the software being computer-readable, wherein the software includes instructions for causing a computer to:

receive from a first user a plurality of bids and offers for options assigned to the class within a single message, wherein the number of received bids and offers is not greater than a first maximum, and wherein a quote for each bid or offer is required to fall within a first predetermined range of values for all series within the class;

receive from a second user a plurality of bids and offers for options assigned to the class within a single message, wherein the number of received bids and offers is not greater than a second maximum, and wherein a quote for each bid or offer is required to fall within a second predetermined range of values for a predetermined set of series within the class, the predetermined set not including all series within the class;

receive from a third user an individual bid or offer for an option assigned to the class within a single message with no restriction on a quote for the entered bid or offer; and complete a trade by matching a bid to a corresponding offer; and track a cumulative delta for the first user by adding a delta corresponding to a completed trade whenever a bid or offer received from the first user is matched, the delta being selected from the group consisting of a volume of the trade and a total number of bids and offers associated with the trade; and when the first user cumulative delta exceeds a predetermined delta limit, provide an option to the first user to withdraw all outstanding bids and offers that were simultaneously entered by the first user.

18. The storage medium of claim 17, wherein the software further includes instructions for causing a computer to:

track a cumulative delta for the second user by adding a delta corresponding to a completed trade whenever a bid or offer entered by the second user is matched, the delta being selected from the group consisting of a volume of the trade and a total number of bids and offers associated with the trade; and when the second user cumulative delta exceeds a predetermined delta limit, provide an option to the second user to withdraw all outstanding bids and offers that were simultaneously entered by the second user.

19. The storage medium of claim 17, wherein the software further includes instructions for causing a computer to restrict a rate of entry of bids and offers by the first user by rejecting an attempt by the first user to enter an additional bid or offer when a rate of received bids and offers from the first user exceeds a predetermined limit.

20. The storage medium of claim 19, wherein the predetermined limit is 100 messages per second.

21. The storage medium of claim 17, wherein the software further includes instructions for causing a computer to restrict a rate of entry of bids and offers by the second user by rejecting an attempt by the second user to enter an additional bid or offer when a rate of received bids and offers from the second user exceeds a predetermined limit.

22. The storage medium of claim 21, wherein the predetermined limit is 100 messages per second.

23. The storage medium of claim 17, wherein the software further includes instructions for causing a computer to restrict an aggregate rate of entry of bids and offers by all users by rejecting an attempt by any user to enter an additional bid or offer when an aggregate rate of received bids and offers from all users exceeds a predetermined limit.

24. The storage medium of claim 23, wherein the predetermined limit is 10,000 messages per second.

* * * * *